UNITED STATES PATENT OFFICE.

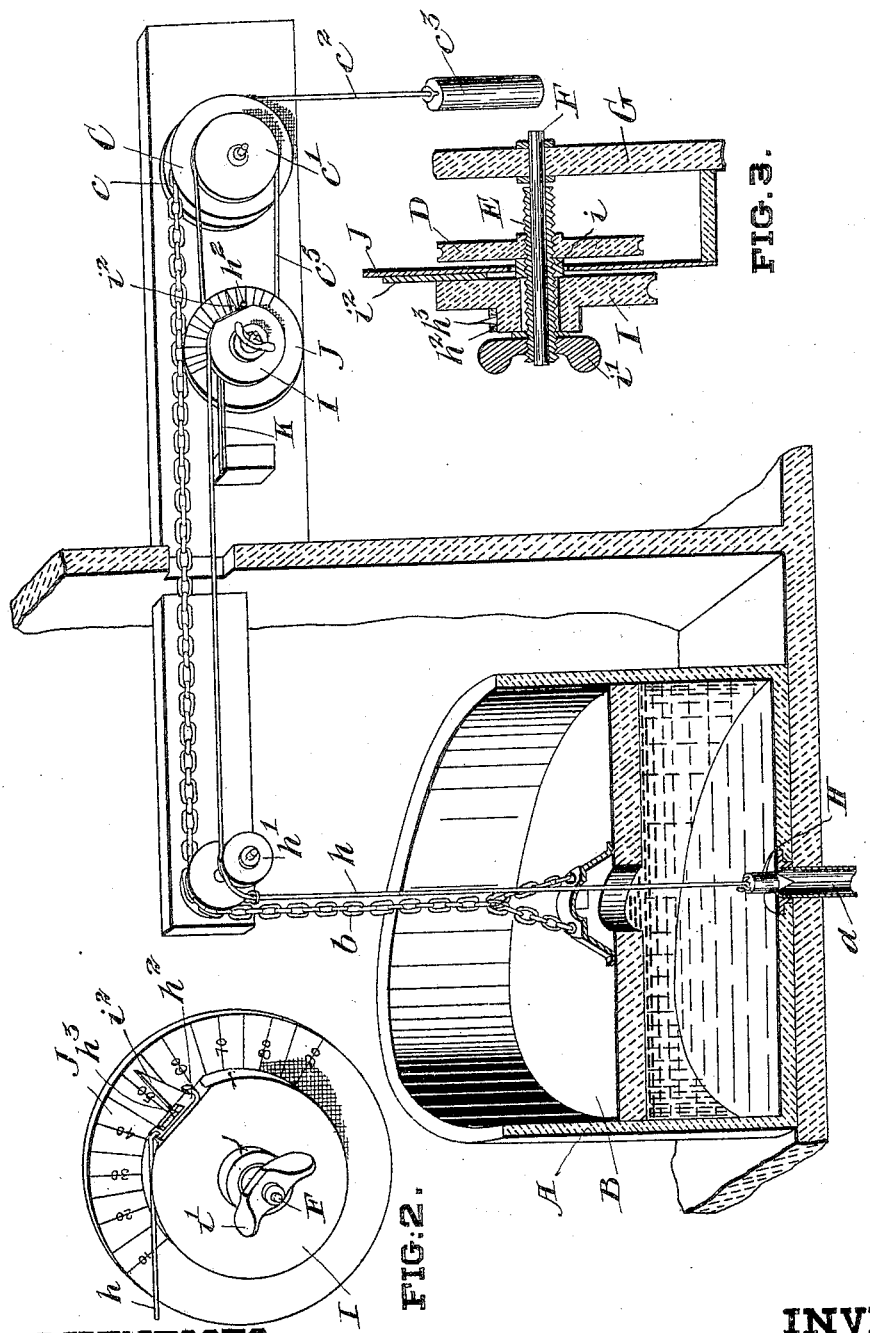

HUGH RANALD MACDONALD, OF ALEXANDRIA, CANADA.

WHEY-MEASURING APPARATUS.

No. 818,545.  Specification of Letters Patent.  Patented April 24, 1906.

Application filed June 15, 1905. Serial No. 265,463.

*To all whom it may concern:*

Be it known that I, HUGH RANALD MACDONALD, law clerk, of Alexandria, in the county of Glengarry, Province of Ontario, Dominion of Canada, have invented certain new and useful Improvements in Whey-Measuring Apparatus, of which the following is a specification.

My invention relates to improvements in whey-measuring apparatus; and the objects of my invention are to provide a device of this class of cheap and simple construction which will apportion automatically the just proportion of whey due to each customer in proportion to the quantity of milk he brings to the cheese-factory; and it consists, essentially, of a suitable whey-vat, a valve for the same, a float designed to lie on the surface of the whey therein, a pulley connected to the said float, so that the motion of the float up and down rotates the pulley, an index-finger operated by the motion of the pulley, and an indicator-dial adapted to coact with such index-finger, and means whereby the valve will be automatically operated when the index-finger has traveled a certain distance on said dial, the various parts of the device being constructed and arranged in detail as hereinafter more particularly described.

Figure 1 is a perspective view of my device, some of the parts thereof being in section to more clearly show the construction. Fig. 2 shows an enlarged perspective detail view of the indicator-dial and index-finger operating therewith. Fig. 3 shows a transverse section of the same.

In the drawings like letters of reference indicate corresponding parts in each figure.

A is a whey-vat of any desirable shape or construction provided with an opening $a$ for the withdrawal of the whey. B is a float floating on the surface of the whey in the said vat and preferably conforming to the inside shape of the vat. A chain $b$ or other suitable means connects this float with a pulley C. The said pulley is provided with a second sheave $c$, in which is secured a cord $c^2$, to which is attached a weight $c^3$. By this means the chain $b$ is always kept taut. A third sheave $c'$ of the pulley C is connected by a belt $c^5$ or other suitable means to another pulley D, which is rigidly secured to a threaded sleeve E, which is rotatably secured on a shaft F, which is rigidly supported in the framework G of the building or in any other desirable manner.

The opening $a$ of the vat is provided with a suitable valve H of any suitable or desirable construction, that I have shown being simply a conical valve. This is connected by suitable means, such as the cord $h$ over the pulley $h'$, to a member $h^2$, which is secured to a pin $h^3$ on the periphery of a grooved pulley I, which pulley is rotatably mounted on the sleeve E and separated from the pulley D by means of the washer $i$. A thumb-nut $i'$ is adapted to screw on the sleeve E, whereby the pulley I may be secured to the pulley D and made to partake of the motion thereof.

An index-finger $i^2$ is secured to the pulley I, and an indicator-dial J, adapted to coact with said index-finger, is non-rotatably secured in the rear thereof. A trigger K is secured to the frame of the building or other such support adapted to release the member $h^2$ on passing that point. The form of this trigger K is quite immaterial, the form I have shown being simply a straight piece of bar metal attached in a suitable manner to the frame of the building. The release of this member, it will be seen by the drawings, operates the valve H, and so stops the flow of whey.

Having now pointed out the principal parts of my mechanism, I will briefly describe the manner of operation of the same.

The indicator-dial is so graduated that when the index-finger is at zero the valve will be shut off. When, however, the index-finger $i^2$ and pulley I are moved around and clamped with the index-finger opposite a certain graduation marked on the indicator-dial, the valve H will be opened and the whey will run out through the opening $a$. As the whey runs out the float B will sink. This will rotate the pulley C, which rotates the pulley D, and as the pulley I has been clamped to it it will also be rotated. Finally the member $h^2$ on the periphery of the pulley I will be released by the trigger K and the valve closed, thus stopping the supply of whey. It will thus be seen that the whey has been allowed to run out during the time the indicator $i^2$ moved from the graduation marked on the dial to the zero-mark.

It is manifest that the dial J may be graduated to correspond with the amount of milk the customer brings to the cheese-factory, and all that will be needed to secure him his just proportion of whey will be to move the index-finger around until it reaches the graduation-mark corresponding with the amount of milk which he brought. The whey will then flow out until he has secured the amount due him. It will be seen that the graduations of the indicator-dial are empirical and will vary according to the size of the whey-vat, indicator-dial, &c. I may here mention that my apparatus may be very easily adjusted so as to operate when the float is being raised instead of lowered. A mere reversal of the indicator-dial and action of the pawls would effect this.

It will be seen on examination that this is an invention in which a great many variations may be made in the details of construction without materially departing from the spirit of my invention. I therefore do not wish to limit myself to the construction herein shown, but claim the right to use any or all such modifications which may come within the scope of my invention.

What I claim as my invention is—

1. In a device of the class described the combination with the whey-vat and valve therefor, of a float, a rotatable index-finger, a dial coacting therewith, means whereby the lowering of the float operates the said index-finger and means whereby the said valve may be closed when the index-finger reaches a predetermined point on the dial as and for the purpose specified.

2. In a device of the class described in combination a whey-vat, a suitable valve therefor, a pulley, means for operating the same, a pointer provided on said pulley a fixed indicator-dial adapted to coact with said pointer and means for communicating the motion of said pulley to said valve as and for the purpose specified.

3. In a device of the class described in combination a whey-vat, a suitable valve therefor, a pulley, means for operating the same, a pointer provided on said pulley, a fixed indicator-dial adapted to coact with said pointer, a member $h^2$ connected by suitable means to said valve, a pin securing said member on pulley, and a trigger for automatically releasing said member as and for the purpose specified.

4. In a device of the class described a whey-vat, a suitable valve therefor, a float, a pulley, means for communicating the motion of said float to said pulley, a member $h^2$ on the pulley, means connecting said member with the valve, and a trigger for automatically releasing said member as and for the purpose specified.

5. In a device of the class described in combination a whey-vat, a suitable valve therefor, a float, a pulley, means for communicating the motion of said float to said pulley, a member $h^2$ secured to said pulley, means connecting said member to the valve, a pointer on said pulley, a fixed indicator-dial adapted to coact with said pointer and a trigger adapted to release said member $h^2$ and so close said valve as and for the purpose specified.

6. In a device of the class described in combination a whey-vat, a suitable valve therefor, a float, a pulley, a chain connecting said float to said pulley, counterbalancing means for holding said chain taut and means for causing the rotation of said pulley to operate the valve as and for the purpose specified.

7. In a device of the class described in combination a whey-vat, a suitable valve therefor, a fixed indicator, a pulley provided with a pointer adapted to coact with said indicator, a float, a second pulley, means for communicating the action of said float to said pulley, means for clamping the aforesaid index-pulley to said pulley and means for causing the index-finger to operate the valve by its rotation as and for the purpose specified.

8. In a device of the class described the combination with a whey-vat, and suitable valve therefor, of a fixed indicator, a pulley provided with a pointer adapted to coact with said indicator, a float, a second pulley, means for communicating the action of said float to said second pulley, means for clamping the aforesaid index-pulley to said pulley, a member $h^2$ secured in said pulley, means for connecting the member with the valve, and a trigger for automatically releasing said catch as and for the purpose specified.

Signed at Alexandria, in the county of Glengarry and Province of Ontario, Canada, this 5th day of June, 1905.

HUGH RANALD MACDONALD.

Witnesses:
WILLIAM DUNCAN MCLEOD,
DONALD ALEXANDER MACCARTHY.